United States Patent [19]

Beck et al.

[11] 4,058,152

[45] Nov. 15, 1977

[54] AUTOMOBILE SAFETY TIRES

[75] Inventors: Gilbert Beck, Ludwigshafen; Ludwig Zuern, Bad Duerkheim; Erhard Stahnecker, Ziegelhausen, all of Germany

[73] Assignee: BASF Aktiengesellschaft, Ludwigshafen (Rhine), Germany

[21] Appl. No.: 685,976

[22] Filed: May 13, 1976

Related U.S. Application Data

[63] Continuation of Ser. No. 487,234, July 10, 1974, abandoned.

[30] Foreign Application Priority Data

July 12, 1973 Germany .............................. 2335481

[51] Int. Cl.² .............................................. B60C 17/00
[52] U.S. Cl. ................................................... 152/310

[58] Field of Search ............... 152/346, 347, 348, 310, 152/311, 312, 313, 339, 340, 314

[56] References Cited

U.S. PATENT DOCUMENTS

| 822,021 | 5/1906 | Sanderson | 152/311 |
|---|---|---|---|
| 1,227,791 | 5/1917 | Huebner | 152/311 |
| 2,237,182 | 4/1941 | Iknayan | 152/313 |
| 3,022,810 | 2/1962 | Lambe | 152/310 |
| 3,381,735 | 5/1968 | Talcott et al. | 152/313 |
| 3,854,516 | 12/1974 | Burnell | 152/313 |
| 3,921,689 | 11/1975 | Caccia et al. | 152/312 |

Primary Examiner—Drayton E. Hoffman
Attorney, Agent, or Firm—Keil, Thompson & Shurtleff

[57] ABSTRACT

Tubeless automobile tires filled with foam, the foam used being closed-cell foamed particles of a partially crystalline olefin polymer of olefins of from 2 to 6 carbon atoms.

4 Claims, 3 Drawing Figures

AUTOMOBILE SAFETY TIRES

This is a continuation, of application Ser. No. 487,234 filed July 10, 1974, now abandoned.

The present invention relates to a tubeless automobile safety tire which is filled with a foam.

Prior art automobile tires consist of an outer cover which is given the desired load-bearing capacity and elasticity by means of air pumped into said cover or into an inner tube. When the outer cover of a tubeless tire or the inner tube of a tire is damaged, the tire loses its shape-retaining properties because of rapid deflation. Tires filled with foamed polyurethane are also known. The tire pressure is determined by the amount and composition of the foamed material (cf. Rubber Age 102 (1970), No. 6, pp. 47–53). Since the material is foamed in the tire itself, the manufacture of such tires is very complicated. Furthermore, the distribution of the foam in the tire is not uniform.

It is an object of the present invention to provide an automobile safety tire of the type defined above, which is capable of withstanding high impact stresses of a periodic nature and is simple to manufacture.

This object is achieved, according to the invention, by using, as the foam, closed-cell particles of a partially crystalline olefin polymer of olefins of from 2 to 6 carbon atoms.

The closed-cell foamed particles consist of an olefin polymer having an X-ray crystallinity at 25° C of more than 20% by weight. Examples of suitable polymers are homopolymers of ethylene, propylene, butene-1 and 4-methylpentene-1. Processes for the manufacture of These polymers are well known. We prefer to manufacture the closed cell foamed particles using ethylene polymers manufactured by the well-known high-pressure polymerization of ethylene, e.g. polyethylenes having a density of from 0.918 to 0.935 g/cm$^3$ and copolymers of ethylene with other ethylenically unsaturated compounds. The ethylene copolymers contain at least 50% by weight of polymerized units of ethylene. Suitable comonomers are, for example, acrylates and methacrylates in which the ester components are derived from alcohols of from 1 to 18 carbon atoms, vinyl esters of saturated carboxylic acids of from 2 to 12 carbon atoms such as vinyl acetate and vinyl propionate, fumaric acid, itaconic acid, maleic acid and esters thereof, carbon monoxide, acrylic acid and methacrylic acid. The ethylene copolymers may, if desired, contain polymerized units of 2 or more ethylenically unsaturated compounds, for example they may be copolymers of ethylene, vinyl acetate and ethyl acrylate. Also suitable are copolymers of ethylene and propylene, ethylene and butene-1 and ethylene and 4-methylpentene-1. These polymers are prepared by the well-known low-pressure polymerization process (polymerization using Ziegler or Phillips catalysts). The melt index of the olefin polymers is between 0.1 and 200 g/10 min. (190° C/2.16 kg, ASTM D 1238-65 T). Manufacture of the foamed olefin polymers may also be carried out starting from a mixture of several olefin polymers, for example a mixture of low-pressure polyethylene having a density of from 0.940 to 0.965 g/cm$^3$ with high-pressure polyethylene having a density of from 0.918 to 0.930 g/cm$^3$ in a ratio of 1:1 or a mixture of high-pressure polyethylene with a copolymer of ethylene and vinyl acetate.

The manufacture of foamed, closed-cell particles from said olefin polymers is well known. For example, an olefin polymer or a mixture of a number of olefin polymers may be mixed in an extruder with a volatile expanding agent such as butane, pentane, 1,2-dichlorotetrafluoroethane and 2,2-dimethylbutane at temperatures above the crystallite melting point of the olefin polymer, the mixture then cooled to a temperature near the crystallite melting point of the olefin polymer and the expandable mixture then extruded through a perforated die. The extrudate foams and is broken up immediately. There are thus obtained fully foamed particles of olefin polymer. Depending on the type of expanding agent used, the expanding agent remaining in the cells of the foam diffuses out of the cells at various rates, quicker than the air can pass into the cells. This causes subatmospheric pressure to form in the cells of the olefin polymer particles and as a result the foamed particles shrink. When these shrunken particles are stored for a relatively long period in air, they re-assume the original volume of the fully foamed particles. To accelerate this operation, the shrunken foamed olefin polymer particles may be stored, if desired, at a temperature of up to about 20° C below the crystallite melting point of the olefin polymer and at elevated pressure, for example pressures of up to 10 atmospheres, in air or inert gases. There are thus obtained closed-cell fully foamed particles of olefin polymer having a diameter of from 3 to 40 mm and preferably from 5 to 20 mm. The bulk density of the particles is from 10 to 100 and preferably from 12 to 50 g/1. In addition to such foams containing 100% closed cells, those having up to 30% of open cells are also suitable.

In the preferred embodiment of the invention, shrunken olefin polymer particles are used. The shrunken olefin polymer particles are either those directly produced in the manufacture of the foamed particles or they are obtained by heating the foamed particles followed by rapid cooling. Alternatively, fully foamed, closed-cell olefin polymer particles may be stored in a vacuum and then exposed to atmospheric pressure. The particles thus treated also shrink. Another alternative is to treat the fully foamed particles with carbon dioxide or ammonia to cause these gases to penetrate into the cells of the particles, whereupon the particles are stored in an atmosphere of air. The particles shrink because carbon dioxide and ammonia escape from the cells of the particles quicker than the air can pass into them. By shrunken particles we mean foamed particles having a volume which is smaller than that of the fully foamed particles and in which the gas enclosed in the cells is not in equilibrium with the atmosphere surrounding the particles. The volume is usually from 25 to 75% and preferably from 30 to 50% of the volume of the fully foamed particles.

In a further preferred embodiment of the invention use is made of closed-cell, foamed particles containing crosslinked portions. Such particles are prepared, for example, by irradiating the afore-mentioned fully foamed or shrunken olefin polymer particles with high-energy radiation in a dose of from 10 to 80 and preferably from 40 to 60 megarads. We prefer to irradiate the foamed olefin polymer particles with electron beams or with X-rays or cobalt rays. After such irradiation, the foamed particles contain from 20 to 85% and preferably from 30 to 70%, by weight, of crosslinked portions. Particularly suitable for crosslinking are polyethylene having a density of from 0.918 to 0.935 g/cm$^3$, ethylene copolymers and polypropylene.

It is also possible to use foamed crosslinked particles which have been prepared by heating a mixture of an olefin polymer, a gas-donating expanding agent and a peroxide and comminuting the foam. In order to cause such mixtures to foam, they are heated to temperatures above the decomposition point of the peroxide and of the gas-donating expanding agent. Processes for the manufacture of such foams are well known. Suitable closed-cell foamed olefin polymer particles for the purposes of the invention may be round, cylindrical, pellet-shaped or cubic.

The foamed closed-cell olefin polymer particles may contain additives such as are usually incorporated in olefin polymers, for example stabilizers, flameproofers, dyes, lubricants, fillers and other polymers such as polyisobutylene, polybutadiene-1,3 and polyisoprene.

The tubeless automobile safety tires of the invention are obtained by passing the aforementioned closed-cell foamed particles of polyolefin through, say, a sealable opening in the rim of the wheel into the space between the rim and the inside wall of the tire and then pumping a gas into said space. The gas may be pumped in through the same sealable opening or through a separate valve. Suitable gases are all gases which are inert to the polyolefins used, e.g. air, nitrogen and carbon dioxide. The gas pressure in the tire is generally between 0.1 and 5 and preferably between 0.5 and 2.5 atmospheres gage. When an automobile tire is filled with fully foamed particles of an olefin polymer and is then pumped up with an inert gas, the volume of the foamed closed-cell particles initially diminishes. However, the foamed shrunken particles expand to re-assume their original volume. This is the case when the pressure of the gas in the tire is equal to the pressure in the individual cells of the foamed closed-cell polyolefin particles. As mentioned above, it is particularly advantageous to use shrunken, foamed polyolefin particles and it is also convenient to use profiles having gassing channels for this makes it possible to achieve a particularly uniform filling in the automobile tire. Since the volume of the shrunken particles is usually from 25 to 75% of the volume of the fully foamed particles, these particles expand under the pressure of pressurized inert gas so as to fill the cavity almost completely. The air pressure in the tire remains virtually unchanged.

Foamed, closed-cell and crosslinked olefin polymer particles are used where higher thermal resistance is required of the material.

When the tire of the invention is damaged (punctured), the gas pressure in the tire between the foamed particles at the site of the puncture falls to atmospheric pressure but the tire retains its shape. Since the pressure in the cells of the foamed particles is greater than in the space where the tire is punctured, the fully foamed particles expand further with the result that the rigidity of the tire is reduced only slightly and there is virtually no change, initially, in the total tire pressure. The pressure in the individual cells of the foamed particles will slowly fall on account of diffusion through the cell walls and there is no risk of a sudden change in the performance properties of the tire. Where there are no or virtually no inter-particulate channels, as is particularly the case when shrunken particles are used, no reduction in pressure within the tire is likely to occur immediately after the tire has been punctured, since the particles expand and seal up the resulting puncture.

To improve the heat transfer in the tire, the foamed polyolefin particles are coated with metal powder, for example copper or aluminum powder, or flexible metal ribbons are mixed in with the foamed particles. The foamed particles may also be coated with graphite, talcum, paraffin oil or castor oil. This reduces the generation of heat or improves the removal of heat generated in the tire whilst running.

An embodiment of the invention is illustrated in the drawing wherein.

Figure 1:
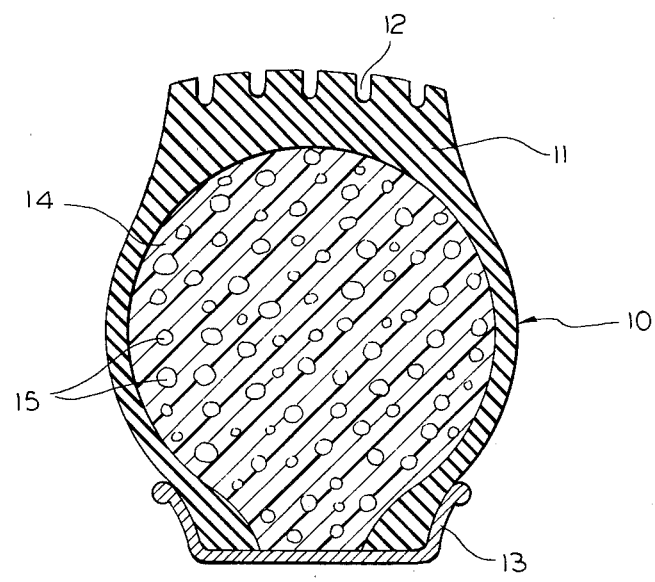
FIG. 1 is a transverse cross section of a foam particle-filled automobile or truck tire casing mounted on a rim.
Figure 2:
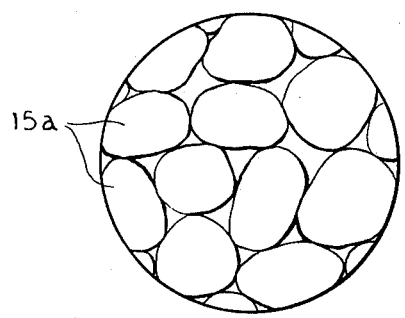
FIG. 2 is a magnified view of shrunken particles of the foam, closed cell polyolefins used to fill the tire case in accordance with the invention.
Figure 3:
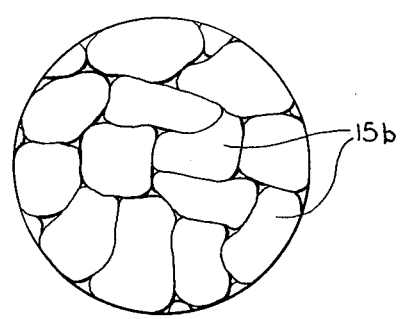
FIG. 3 is a magnified view of the same particles after they have been expanded upon bringing the gas pressure in the tire casing to 0.5 to 5 atmospheres gauge.

In the drawing, the tire casing 10 is of known, common construction. It has a peripheral portion 11 which is of greater thickness than the remaining parts of the casing, the outer peripheral wall of which bears grooves 12 forming the tire tread. The inner radial portion of the casing is mounted in the usual manner in a wheel rim 13. The hollow space formed by the interior of the tire casing 10 and the rim 13 is substantially filled with a body 14 of individual foam olefin polymer particles 15. Initially these particles are foam, shrunken, closed cell particles 15a of olefin polymers and have voids of relatively large size between the particles (FIG. 2). When the pressure within the tire casing 10 is raised to 0.5 to 5 atmospheres gauge, the particles expand into a more compact composite of expanded particles 15b (FIG. 3) having virtually no inner-particulate channels or spaces between the particles.

The invention is illustrated below with reference to the following Examples.

EXAMPLE 1

An auotmobile tire is filled with shrunken, approx. shperical particles of a polyethylene having a density of 0.918 g/cm$^3$ and a melt index of 1.5 g/10 min. and air is then pumped in to a pressure of 1.4 atmospheres gage. The diameter of the foamed, closed-cell polyethylene particles is 4 to 5 mm and their bulk density is 30 g/l. The shrunken particles are obtained by storing fully foamed particles having a density of 12 g/l and an average diameter of 6 to 8 mm for 40 minutes at a pressure of 550 mm of Hg. After 48 hours, a puncture is simulated by letting out the air in the tire. The tire retains its shape very well and its good performance characteristics remain unchanged.

EXAMPLE 2

A truck tire is filled with shrunken particles of crosslinked polyethylene foamed pellets having a diameter of 10 mm, a length of 45 mm and a bulk density of 14 g/l and air is pumped into the tire to a pressure of 1.9 atmospheres gage. The polyethylene has a density of 0.918 g/cm$^3$ and a melt index of 3.8 g/10 min. and contains 45% w/w of crosslinked portions. The volume of the shrunken polyethylene foamed pellets is 60% of that of the fully foamed (non-shrunken) pellets. After 3 days, a puncture is simulated by letting out the air. This tire retains its shape and rigidity after said simulated damage.

In place of crosslinked polyethylene foamed particles it is possible to use foamed particles of polybutene-1 having a bulk density of 16 g/l.

This imparts very good thermal resistance to the tire.

EXAMPLE 3

Following the procedure described in Example 1, shrunken foamed particles of syndiotactic polypropylene having a density of 0.905 g/cm$^3$ are placed in an automobile tire. The diameter of the foamed, non-shrunken closed-cell polypropylene foamed particles is from 6 to 7 mm and the bulk density is 75 g/1. These particles are used after storage in a vacuum of 650 mm of Hg for 60 minutes to effect shrinking thereof. The resulting tire passes the simulated puncture test very well. In addition, it possesses very good thermal stability.

EXAMPLE 4

An automobile tire is filled with foamed particles which have been crosslinked by irradiation to give 35% w/w of insoluble portions and which consist of a polyethylene containing 4.5% by weight of copolymerized units of vinyl acetate and having a density of 0.924 g/cm$^3$ and a melt index of 3.7 g/10 min. The foamed particles, which have an average diameter of 12 mm and a bulk density of 13 g/1, are force into the tire through an opening in the rim of the wheel by means of a compressed air filling pistol.

A puncture is simulated after 20 hours by letting out the air. The tire retains good performance characteristics in this condition.

We claim:

1. A safety tire and wheel assembly including: an outer wheel rim; a tubeless tire seated about said rim; and substantially closed-cell, foamed, discrete particles of a partially crystalline polymer of an olefin of from 2 to 6 carbon atoms filling the space between said rim and the interior walls of said tire, said discrete particles having a final diameter of from 3 to 40 mm and a bulk density of from 10 to 100 g/1, said tire being under a gas pressure of from 0.1 to 5 atmospheres gage, said discrete particles further having a reduced size when initially placed within the tire and expanding thereafter under said gas pressure in said tire.

2. An assembly as set forth in claim 1 wherein the particles initially placed in said space are shrunken to from 25 to 75% of the volume of the fully foamed particles.

3. An assembly as set forth in claim 2 wherein said particles have a diameter of from 5 to 20 mm, a bulk density of from 12 to 50 g/1, wherein said particles substantially fill said space, and wherein said tire is under a gas pressure of from 0.5 to 2.5 atmospheres gage.

4. A safety tire and wheel assembly including: an outer wheel rim; a tubeless tire seated about said rim; and substantially closed-cell, foamed, discrete particles of a partially crystalline polymer of an olefin of from 2 to 6 carbon atoms filling the space between said rim and the interior walls of said tire, said discrete particles having a final diameter of from 3 to 40 mm and a bulk density of from 10 to 100 g/1, said tire being under a gas pressure of from 0.1 to 5 atmospheres gage, and said discrete particles being formed particles initially having less gas pressure in the closed cells than the gas pressure in the atmosphere surrounding said particles and thereby having been shrunken to from 25 to 75% of the volume of the particles when they are fully foamed, and said particles expanding by diffusion of gas into the cells under said 0.5 to 5 atmospheres gauge gas pressure of said tire and having virtually no inter-particulate channels between said particles.

* * * * *